United States Patent
Samson et al.

(10) Patent No.: US 11,823,052 B2
(45) Date of Patent: Nov. 21, 2023

(54) CONFIGURABLE MAC FOR NEURAL NETWORK APPLICATIONS

(71) Applicant: QUALCOMM Incorporated, San Diego, CA (US)

(72) Inventors: Giby Samson, San Diego, CA (US); Srivatsan Chellappa, San Diego, CA (US); Ramaprasath Vilangudipitchai, San Diego, CA (US); Seung Hyuk Kang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 1076 days.

(21) Appl. No.: 16/599,306

(22) Filed: Oct. 11, 2019

(65) Prior Publication Data

US 2021/0110267 A1 Apr. 15, 2021

(51) Int. Cl.
*G06N 3/082* (2023.01)
*G06F 7/544* (2006.01)
*G06N 3/063* (2023.01)

(52) U.S. Cl.
CPC .......... *G06N 3/082* (2013.01); *G06F 7/5443* (2013.01); *G06N 3/063* (2013.01)

(58) Field of Classification Search
None
See application file for complete search history.

(56) References Cited

U.S. PATENT DOCUMENTS

| 6,768,515 B1* | 7/2004 | Erten | G06N 3/065 706/15 |
| 10,452,472 B1* | 10/2019 | Graves | G06F 11/1048 |
| 10,491,239 B1* | 11/2019 | Hubara | G06F 5/012 |
| 2004/0158543 A1* | 8/2004 | Salam | G06N 3/063 706/26 |
| 2009/0265528 A1* | 10/2009 | Du | G06F 9/3887 712/E9.016 |
| 2014/0143564 A1* | 5/2014 | Tannenbaum | G06F 1/3243 713/320 |
| 2017/0322808 A1* | 11/2017 | Magrath | G06F 9/30112 |
| 2019/0042191 A1* | 2/2019 | Langhammer | G06F 7/5443 |
| 2019/0310847 A1* | 10/2019 | Grocutt | G06F 9/30145 |

OTHER PUBLICATIONS

Fu, Yao, et al., 8-Bit Dot Product Acceleration, 2017, Xilinx, 15 pages. (Year: 2017).*

(Continued)

*Primary Examiner* — Eric Coleman
(74) *Attorney, Agent, or Firm* — Patterson + Sheridan, L.L.P.

(57) ABSTRACT

Certain aspects of the present disclosure are directed to methods and apparatus for configuring a multiply-accumulate (MAC) block in an artificial neural network. A method generally includes receiving, at a neural processing unit comprising one or more logic elements, at least one input associated with a use-case of the neural processing unit; obtaining a set of weights associated with the at least one input; selecting a precision for the set of weights; modifying the set of weights based on the selected precision; and generating an output based, at least in part, on the at least one input, the modified set of weights, and an activation function.

18 Claims, 9 Drawing Sheets

(56) References Cited

OTHER PUBLICATIONS

Zhuang, B., et al., Towards Effective Low-bit-width Convolutional Neural Networks, 2018, Computer Vision Foundation, pp. 7920-7928 (Year: 2018).*

Zhuang, B, et al., Towards Effective Low-bit-width Convolutional Neural Networks , 2018 Computer Vsion Foundation abstract (2 pages.) (Year: 2018).*

Agrawal A., et al., "Approximate Computing: Challenges and Opportunities," International Conference on Rebooting Computing (ICRC), IEEE, 2016, 8 pages.

Courbariaux M., et al., "Binarized Neural Networks: Training Neural Networks with Weights and Activations Constrained to +1 or −1", Mar. 17, 2016, 11 pages.

Shanthala S., et al., "VLSI Design and Implementation of Low Power MAC Unit with Block Enabling Technique," European Journal of Scientific Research, 2009, vol. 30, No. 4, pp. 620-630.

* cited by examiner

CONFIGURABLE MAC FOR NEURAL NETWORK APPLICATIONS

FIELD OF THE DISCLOSURE

The present disclosure generally relates to artificial neural networks and, more particularly, to a configurable multiply-accumulate block for neural network applications.

DESCRIPTION OF RELATED ART

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots, to name just a few.

Individual nodes, such as multiply-accumulate (MAC) blocks, in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Multi-media applications, which have historically catered to the higher-end (throughput driven) applications, have pushed the need for higher weight precision MAC blocks, leading to an increase in MAC block complexity and an increase in power consumption. However, in many cases, an application may not require such high weight precision and, thus, power resources may be wasted if the MAC blocks are operating at a higher weight precision than needed.

BRIEF SUMMARY

Certain aspects of the present disclosure are directed to a method for configuring a multiply-accumulate (MAC) block in an artificial neural network. The method generally includes receiving, at neural processing unit, comprising one or more logic elements, at least one input associated with a use-case of the neural processing unit; obtaining a set of weights associated with the at least one input; selecting a precision for the set of weights; modifying the set of weights based on the selected precision; and generating an output based, at least in part, on the at least one input, the modified set of weights, and an activation function.

Certain aspects of the present disclosure are directed to an apparatus for configuring a multiply-accumulate (MAC) block in an artificial neural network. The apparatus generally includes a neural processing unit, comprising one or more logic elements, configured to: receive, at neural processing unit, comprising one or more logic elements, at least one input associated with a use-case of the neural processing unit; obtain a set of weights associated with the at least one input; select a precision for the set of weights; modifying the set of weights based on the selected precision; and generate an output based, at least in part, on the at least one input, the modified set of weights, and an activation function. The apparatus may also include a memory coupled with the neural processing unit.

Certain aspects of the present disclosure are directed to an apparatus for configuring a multiply-accumulate (MAC) block in an artificial neural network. The apparatus generally includes means for receiving at least one input associated with a use-case of the neural processing unit; means for obtaining a set of weights associated with the at least one input; means for selecting a precision for the set of weights; modifying the set of weights based on the selected precision; and means for generating an output based, at least in part, on the at least one input, the modified set of weights, and an activation function.

Certain aspects of the present disclosure are directed to a non-transitory computer-readable medium for configuring a multiply-accumulate (MAC) block in an artificial neural network. The non-transitory computer-readable medium generally includes instructions that, when executed by at least one processor, cause the at least one processor to receive, at neural processing unit, comprising one or more logic elements, at least one input associated with a use-case of the neural processing unit; obtain a set of weights associated with the at least one input; select a precision for the set of weights; modifying the set of weights based on the selected precision; and generate an output based, at least in part, on the at least one input, the modified set of weights, and an activation function.

Other aspects, advantages, and features of the present disclosure will become apparent after review of the entire application, including the following sections: Brief Description of the Drawings, Detailed Description, and the Claims.

DETAILED DESCRIPTION

Figure 1:
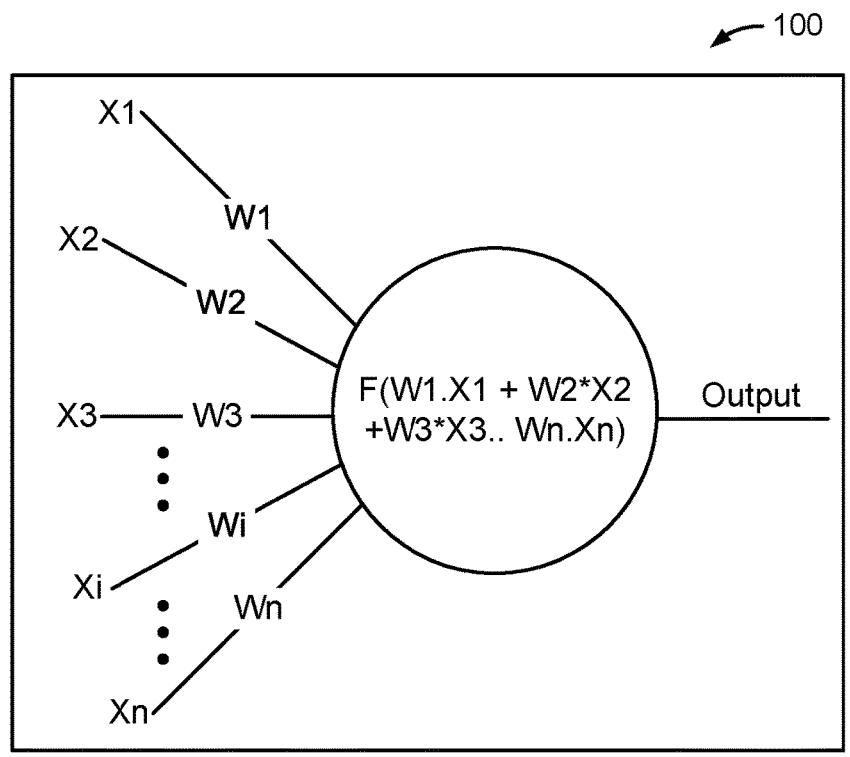
FIG. 1 illustrates an example artificial neuron, according to certain aspects presented herein.

Certain aspects of the present disclosure provide methods and apparatus for configuring a multiply-accumulate (MAC) block in an artificial neural network. For example, in some cases, aspects of the present disclosure involve modifying a set of weights based on selected precision and turning off one or more logic elements of the MAC block based on the modified set of weights, leading to power savings in MAC block and the artificial neural network.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In biological neurons, an output spike generated when a neuron fires is referred to as an action potential. This electrical signal is a relatively rapid, transient, nerve impulse, having an amplitude of roughly 100 mV and a duration of about 1 ms. In a particular embodiment of a neural system having a series of connected neurons, every action potential has basically the same amplitude and duration, and thus, the information in the signal may be represented only by the frequency and number of spikes, or the time of spikes, rather than by the amplitude. The information carried by an action potential may be determined by the spike, the neuron that spiked, and the time of the spike relative to other spike or spikes. The importance of the spike may be determined by a weight applied to a connection between neurons, as explained below.

The transfer of spikes from one level of neurons to another may be achieved through the network of synaptic connections (or simply "synapses"). Relative to the synapses, neurons occurring before the synapses may be considered presynaptic neurons while neurons occurring after the synapses may be considered postsynaptic neurons. The postsynaptic neurons may receive output signals (i.e., spikes) from the presynaptic neurons and scale those signals according to adjustable synaptic weights $w_1^{(i,i+1)}, \ldots, w_P^{(i,i+1)}$ where P is a total number of synaptic connections between the presynaptic neurons and postsynaptic neurons and i is an indicator of the neuron level. Further, the scaled signals may be combined as an input signal of each postsynaptic neuron. Every postsynaptic neuron may generate output spikes based on the corresponding combined input signal. The output spikes may be transferred to another level of neurons using another network of synaptic connections.

Biological synapses can mediate either excitatory or inhibitory (hyperpolarizing) actions in postsynaptic neurons and can also serve to amplify neuronal signals. Excitatory signals depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching a threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

An artificial neural network may be emulated, for example, by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The artificial neural network may be utilized in a large range of applications, such as image and pattern recognition, machine learning, motor control, and alike.

FIG. 1 illustrates an example artificial neuron 100, according to certain aspects presented herein. As illustrated, the artificial neuron 100 may receive a plurality of inputs (e.g., X1-Xn), which may be summed to produce an output. Typically, a different weight (e.g., W1-Wn) may be separately applied to each input to modify the importance of each of the inputs. The sum of the weighted inputs may be passed through a non-linear function, known as an activation function or transfer function, to produce the artificial neuron's output.

Figure 2:
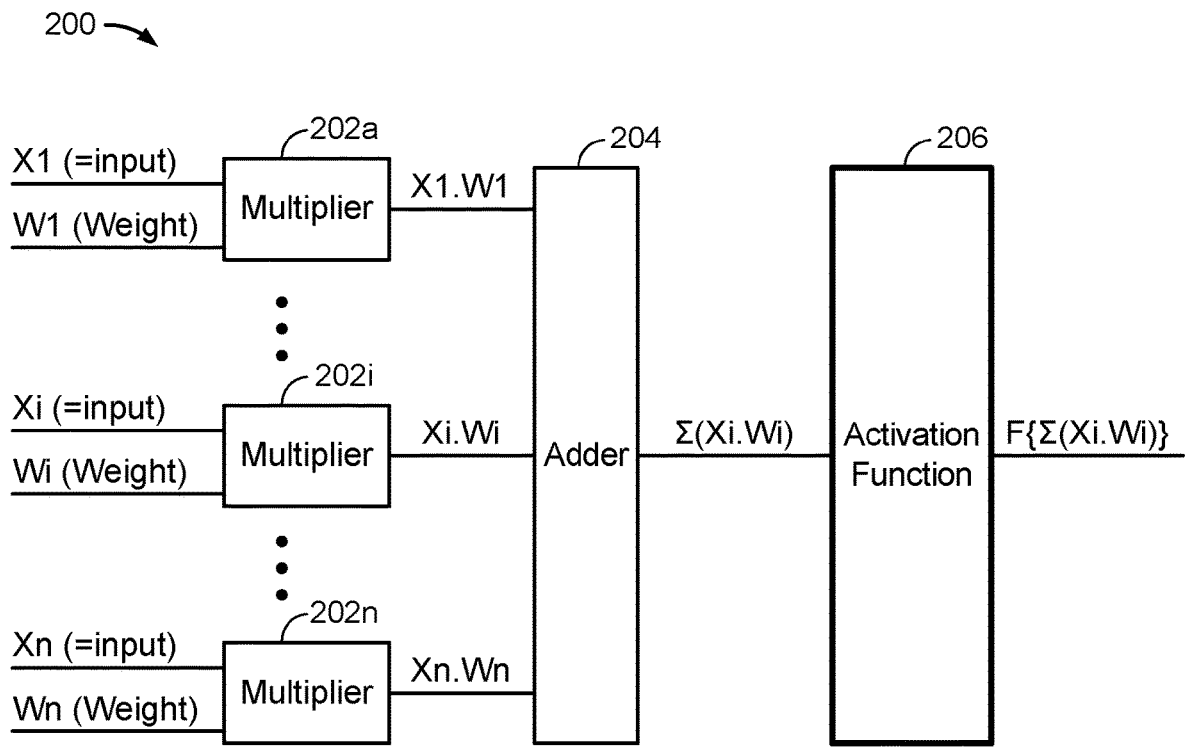
FIG. 2 illustrates an example block-level hardware implementation of the artificial neuron of FIG. 1.

In the modern artificial intelligence (AI)/Machine learning engines that use neural networks, neurons may be implemented as multiply-accumulate (MAC) blocks. Within the MAC blocks, multipliers consumes the most area and power. For example, FIG. 2 illustrates an exemplary MAC block-level hardware implementation 200 of the artificial neuron 100, which may be implemented in one or more processing units such as the CPU 922, DSP 924, GPU 926, and/or NPU 928. As illustrated, the artificial neuron 100 may be implemented by one or more multipliers 202a-202n, an adder 204, and an activation function 206. Further, as illustrated, each multiplier, such as multiplier 202a, may receive an input (e.g., X1) and a weight (e.g., W1). The multiplier 202a may then multiply the input and the weight to generate a weighted input. The weighted input from each multiplier 202a-202n may then be passed to the adder 204, which sums all of the weighted inputs. The sum of the weighted inputs may then be passed through an activation function 206 to generate an output to the hardware implementation 200 of the artificial neuron 100.

Multi-media applications or use-cases, which have historically catered to the higher-end (throughput driven) use-cases requiring complex software and complex hardware, have pushed the need for higher precision MAC blocks, leading to an increase in MAC block complexity and an increase in power consumption. However, in many cases, a use-case may not require such high precision and, thus, power resources may be wasted if the MAC blocks are operating at a higher precision than needed. Therefore, aspects of the present disclosure provide techniques for reducing power consumption in an artificial neural network by implementing a variable precision, configurable MAC that enables power-precision trade-off in artificial neurons.

For example, in certain cases, as will be explained in greater detail below, reducing power consumption in an artificial neural network for a particular use-case may include performing a precision-wise MAC configuration function involving modifying a set of weights applied to inputs of a neural processing unit (e.g., an artificial neuron/MAC) based on a determined/selected precision associated with that use-case. According to aspects, based on the modified weights, certain logic within the neural processing unit may be switched off, leading to power savings.

Figure 3:
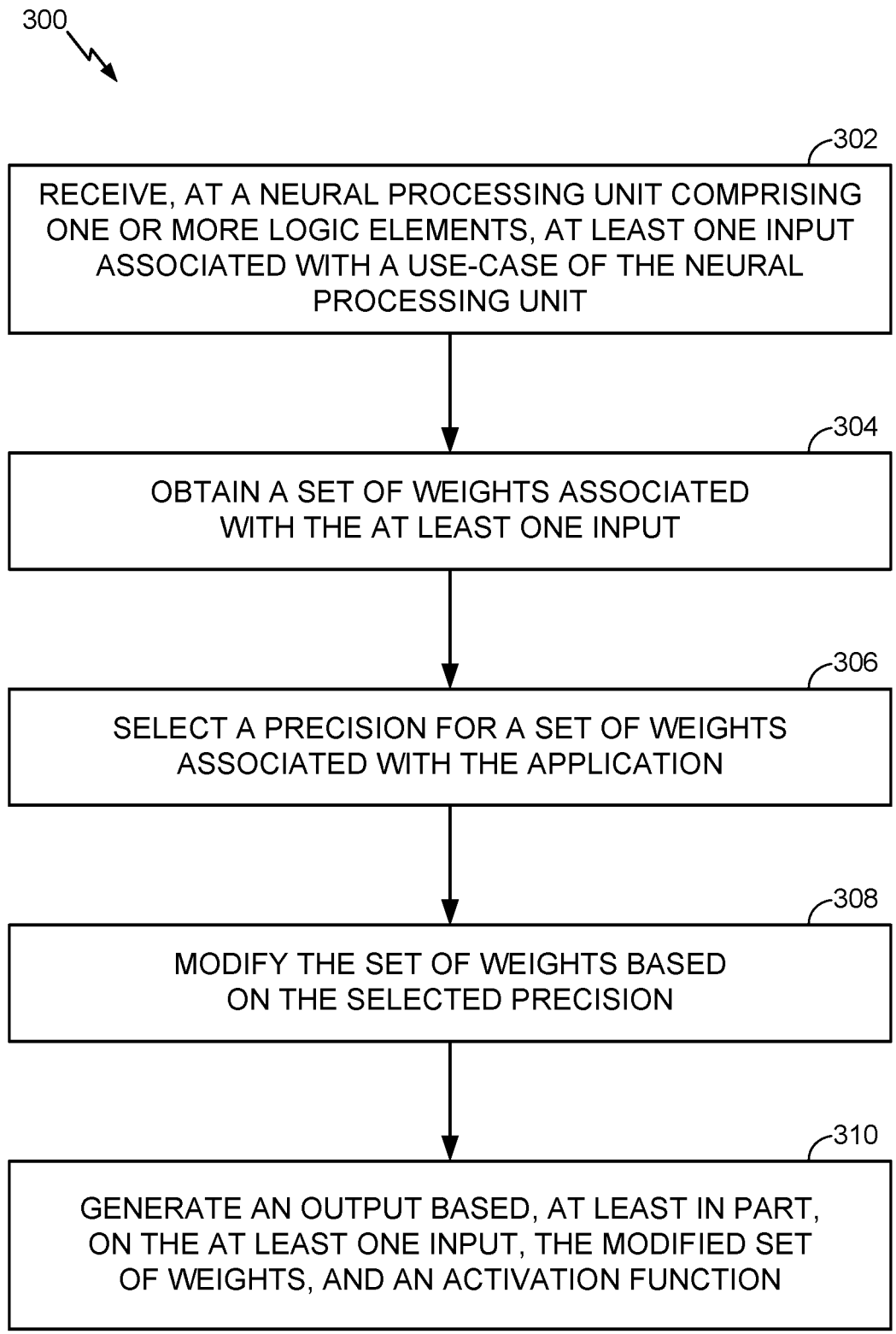
FIG. 3 is a flow diagram of example operations for configuring a multiply-accumulate (MAC) block in an artificial neural network, according to aspects presented herein.

FIG. 3 is a flow diagram of example operations 300 for configuring a multiply-accumulate (MAC) block in an artificial neural network, according to aspects presented herein. According to aspects, operations 300 may be performed, for example, by one or more processors, such as the neural processing unit 928, or other processors described herein (e.g., CPU 922, DSP 924, and/or GPU 926). In certain cases, the neural processing unit 108 may include one or more MAC blocks.

Operations 300 begin at block 302 with receiving, at a neural processing unit comprising one or more logic elements, at least one input associated with a use-case of the neural processing unit. The input may be any type of data that a neural network may be trained on, such as one or more sample images, one or more sample audio recordings, sample text, sample video, etc. Similarly, use-cases of a neural processing unit may include any sort of usage scenario of the neural processing unit, such as facial recognition, voice recognition, data analytics, time optimization tasks, automation, cybersecurity, medical diagnoses, etc.

Further, in some cases, the one or more logic elements comprise at least one of: one or more adder blocks in an adder module of the neural processing unit or one or more multiplier blocks in a multiplier module of the neural processing unit.

At block 304, the neural processing unit obtains a set of weights associated with the at least one input.

At block 306, the neural processing unit selects a precision for the set of weights. In some cases, as explained below, selecting the precision for the set of weights may include determining, from a total number of bits associated with the set of weights, a number of most significant bits for the set of weights, wherein the precision is represented by the number of most significant bits.

At block 308, the neural processing unit modifies the set of weights based on the selected precision. In some cases, modifying the set of weights based on the selected precision may be performed according to a translation algorithm, as explained below. Additionally, in some cases, translation algorithm may be determined based on a nature of the data or the use-case.

At block 310, the neural processing unit generates an output based, at least in part, on the at least one input, the modified set of weights, and an activation function.

Additionally, while not illustrated, operations 300 may further include selectively turning off at least one of the one or more logic elements in the neural processing unit based on the modified set of weights.

According to aspects, selectively turning off the at least one of the one or more logic elements may further comprise decoding the modified set of weights, determining which of the one or more logic elements to turn off based on the decoded modified set of weights, and turning off the at least one of the one or more logic elements based on the determination of which of the one or more logic elements to turn off.

According to aspects, determining which of the one or more logic elements to turn off may include identifying a set of logic elements that do not correspond to the determined number of most significant bits. In this case, turning off the at least one of the one or more logic elements based on the determination of which of the one or more logic elements to turn off may comprise turning off the set of logic elements that do not correspond to the identified number of most significant bits. According to aspects, selectively turning of the at least one of the one or more logic elements may include at least one of: power gating the at least one of the one or more logic elements; or data gating the at least one of the one or more logic elements.

Additionally, while not illustrated, operations 300 may further include storing the set of weights in one or more retention flops that include an always-on output driver. According to certain aspects, the always-on output driver may allow the one or more retention flops to retain the stored set of weights when at least one of the one or more logic elements, corresponding to the one or more retention flops, is power-collapsed.

As noted above, aspects of the present disclosure involve modifying a set of weights applied to inputs of a neural processing unit (e.g., an artificial neuron/MAC) based on a determined/selected precision associated with application use-case of the neural processing unit. In certain cases, the neural processing unit may use the modified weights to selectively turn off logic in one or more logic blocks of the neural processing unit, such as one or more variable precision multipliers or adders.

Figure 4:
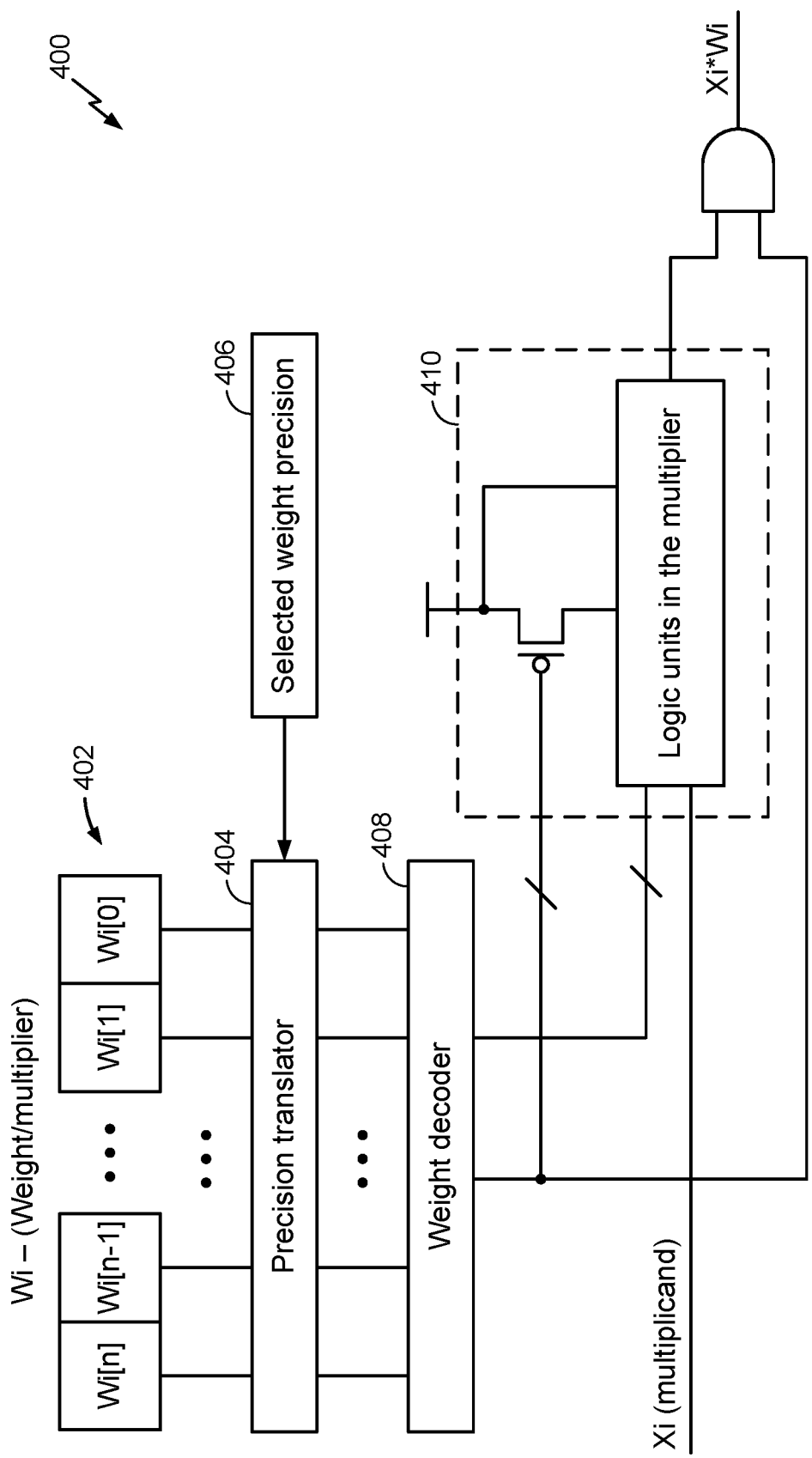
FIG. 4 illustrates an example block diagram of a variable precision multiplier in a neural processing unit, according to certain aspects presented herein.

FIG. 4 illustrates an exemplary block diagram of a variable precision multiplier 400 in a neural processing unit, in accordance with certain aspects of the present disclosure. According to aspects, the variable precision multiplier 400 may determine a precision associated with a use-case of the neural processing unit and modify a set of weights to be applied to input data associated with that application. For example, as illustrated, the variable precision multiplier 400 may receive a set of weights 402 associated with a use-case from a weight buffer. According to aspects, the plurality of weights 402 may pass through a precision translator 404 in the variable precision multiplier 400. For example, in some cases, the precision may be determined based on an explicit user choice (e.g., selecting an environment mode on a camera that changes aperture, exposure, etc.). In other cases, the precision may be determined based on a type of software application being used. For example, in some cases, if a camera application is being used to take a detailed picture, the precision may be determined to be a maximum precision as compared to, for example, an application for scanning a bar code using a camera where the precision may be determined to be, or set, low. In other cases, the precision may be determined based on certain censors and one or more parameters monitored by those censors (e.g., is a user running, walking, in a bright space, dark space)

The precision translator 404 may modify the set of weights, according to a translation algorithm, based on a selected precision 406 for the set of weights, as explained in greater detail below.

In some cases, the variable precision multiplier 400 may select the precision 406 by determining, from a total number of bits associated with the set of weights, a number of most significant bits for the set of weights. In some cases, the precision may depend on use-case type associated with input data and the set of weights, as explained in greater detail below. Additionally, according to aspects, the precision may be represented by the number of most significant bits.

According to aspects, precision translator 404 modifies the set of weights 402 according to a translation algorithm to an approximation that enables downstream optimization by trading-off precision for power. For example, a precision setting may enable multiplier bypass or approximate multiplication, which quantizes the set of weights to a reduced set in the number space according to the translation algorithm, as explained in greater detail below. In some cases, the precision translator 404 may be configurable to change a translation algorithm based on the type of the use-case. For example, in some cases, the translation algorithm may be configured to retain a certain number of most significant one-bits of the set of weights 402 while, in other cases, the translation algorithm may be configured to mask a different number of least significant bits of the set of weights 402.

According to aspects, the modified set of weights may then be passed to a weight decoder 408. The weight decoder 408 may decode the modified set of weights, which may then be passed to the multiplier 410. Decoding the modified set of weights may involve transforming the modified set of weights into a form useable or understandable by multiplier 410.

As illustrated, the multiplier 410 may receive the decoded set of weights and at least one input associated with a use-case of the neural processing unit. The decoded set of weights may be used by the multiplier 410 to generate configuration/power-gating signals that may be used to selectively turn off at least one of the one or more logic elements in multiplier 410 of the neural processing unit. For example, in some cases, multiplier 410 may determine which of the one or more logic elements to turn off based on the decoded modified set of weights. Thereafter, the multiplier 410 may turn off the determined one or more logic elements. Thereafter, a remaining number of logic elements that have not been selectively turned off in the multiplier 410 may be used to multiply the at least one input with a corresponding weight from the decoded set of weights to generate a weighted input. The weighted input corresponding to the multiplier 410 may then be passed to an adder block (not shown) that sums the weighted inputs from one or more multipliers 410.

Figure 5:
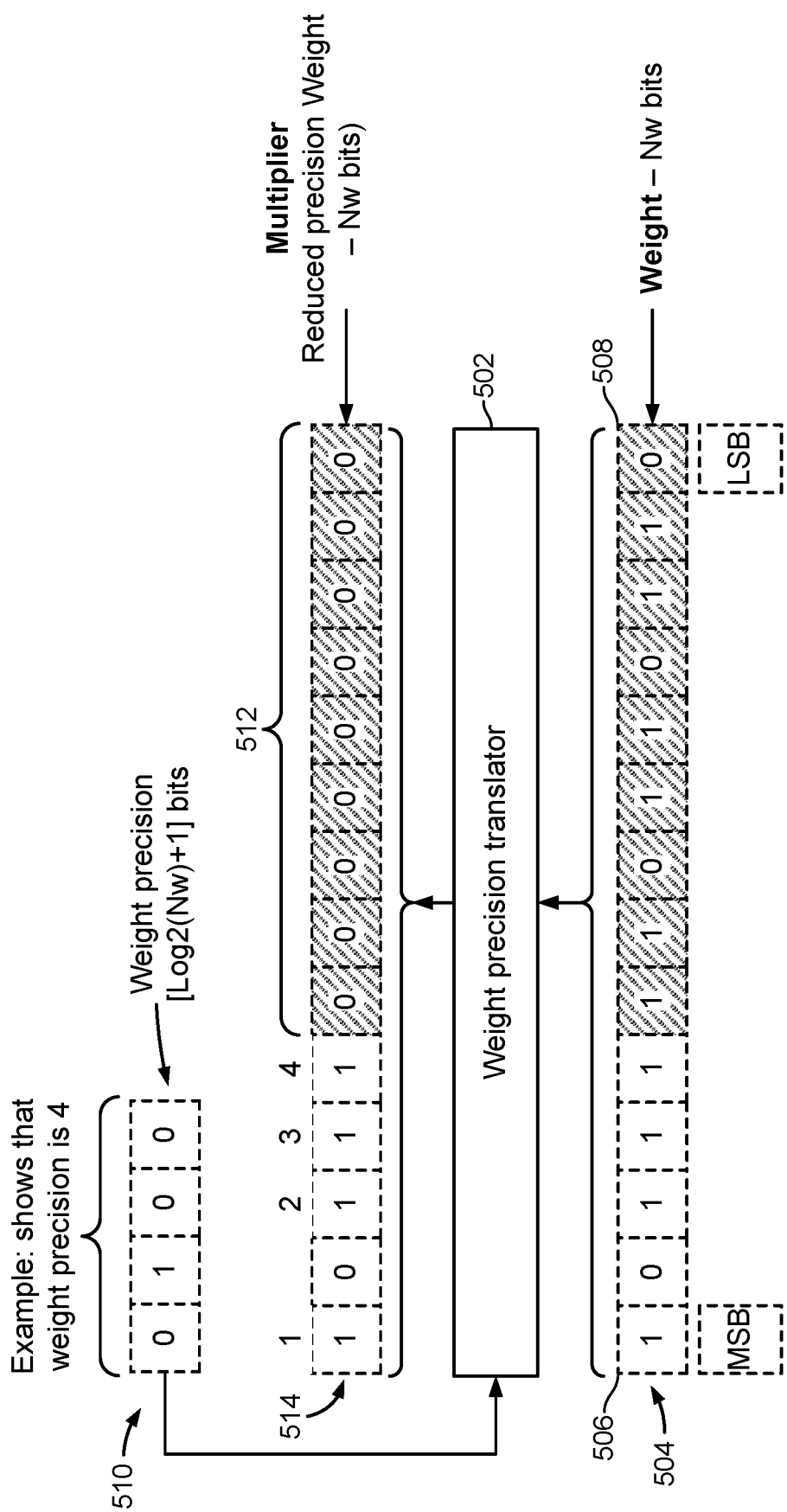
FIG. 5 illustrates an example process for selecting a precision and modifying a set of weights, according to certain aspects presented herein.

FIG. 5 illustrates an example process for selecting a precision and modifying a set of weights, in accordance with certain aspects presented herein. As illustrated, a weight precision translator 502 of a multiplier/neural processing unit may receive a set of weights 504 associated with a use-case. The set of weights 504 may correspond to a plurality of bits (e.g., $N_w$ bits), ranging from a most significant bit (MSB) 506 to a least significant bit (LSB) 508. As illustrated, the set of weights 504 may, in some cases, correspond to 14 bits. In some cases, multiple sets of weights may be associated with a single multiplier which may be selected based on different use-cases. For example, in some cases, a first set of weights may be selected based on a use-case such as facial recognition as opposed to a use-case such as verbal recognition. Yet further, different sets of weights may even be associated with different uses within a same use-case, such as, with respect to facial recognition, one set of weights being associated with human faces and a different set of weights associated with animal faces, etc.

The precision translator 504 may also receive a selected precision for the set of weights 504. In some cases, the neural processing unit may select the precision based on a type associated with the use-case. For example, in some cases, the use-case may be of a type that does not require high precision. In this case, a lower precision may be selected by the neural processing unit. In other cases, the use-case may be of a type that requires high precision. For example, in some cases, a use-case may comprise facial recognition, which may include different types of facial recognition, such as "default" facial recognition (e.g., simply recognizing a face) or more-complex facial recognition (e.g., recognizing a specific person). According to aspects, if a default facial recognition use-case is selected, the neural processing unit may not require a high precision simply to detect a face and, thus, the neural processing unit may select a low precision. However, if the use-case type comprises a more-complex facial recognition type where a specific person's face is trying to be determined, the neural processing unit may require more precision and, thus, select a higher precision.

As noted above, selecting the precision for the set of weights may involve determining, from a total number of bits associated with the set of weights, a number of most significant bits for the set of weights, wherein the precision is represented by the number of most significant bits. As shown in FIG. 5, a precision 510 associated with the set of bits may be selected to be 4 (e.g., 0100 in binary or $Log_2(N_W)+1$ bits), meaning that the precision 510 may be represented by 4 most-significant bits. According to aspects, as shown, 4 most-significant is (e.g., labeled 1-4) may be retained and lesser-significant bits 512 may be forced to zero. Accordingly, based on the selected precision, the weight precision translator 502 may modify the set of weights 504 based on the selected precision 510 to generate a modified set of weights 514, retaining the determined number of most-significant bits. As illustrated, the set of weights 504 may correspond to the decimal number 11214 while the modified set of weights may correspond to the decimal number 11776, representing an error in precision of about 3.6%. As noted above, based on a type of the use-case, this error in precision may be acceptable and thus used to conserve power. It should be noted that the set of weights 504 may be represented in any numerical fashion, such as a floating point, and should not be construed as only representing a decimal number.

For example, as noted above, the modified set of weights 514 may be decoded and used to generate configuration/power-gating signals that may be used to selectively turn off at least one of the one or more logic elements, such as one or more multiplier blocks in a multiplier module (e.g., the variable precision multiplier 400 in FIG. 4) of the neural processing unit and/or one or more adder blocks in an adder module of the neural processing unit (as described below). For example, one or more logic elements corresponding to the lesser-significant bits 512 (e.g., the bits forced to zero) may be selectively turned off based on the decoded modified set of weights 514. For example, in some cases, the neural processing unit may determine which of the one or more logic elements to turn off by identifying a set of logic elements that do not correspond to the determined number of most significant bits described above. Thereafter, the neural processing unit may selectively turn turning off the set of logic elements that do not correspond to the identified number of most significant bits. Alternatively, the neural processing unit may determine a set of logic elements that correspond to the lesser-significant bits 512 and selectively turn off these logic elements. A similar process may be used to selectively turn off one or more adder blocks of an adder module, as described in greater detail below.

Figure 6:
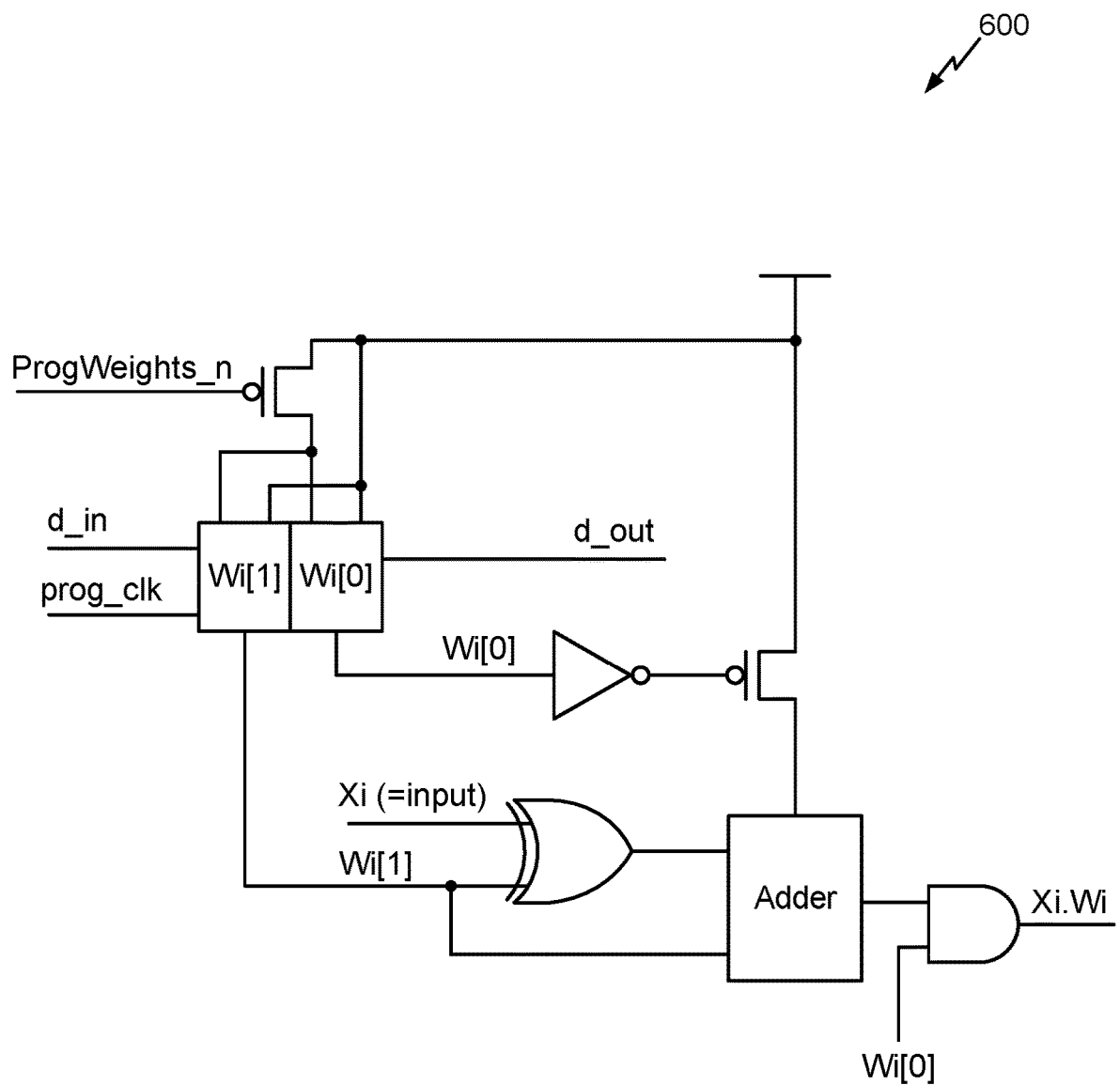
FIG. 6 illustrates an example binary weight multiplier that may be implemented in a neural processing unit, according to certain aspects presented herein.

FIG. 6 illustrates an exemplary binary weight multiplier 600 that may be implemented in a neural processing unit, according to certain aspects presented herein. According to aspects, as illustrated, the ProgWeights_n signal may act as a clock gating signal for flop-programming used to store the set of weights. Additionally, the ProgWeights_n signal may be used as a power-gating/retention signal. According to aspects, the Wi[1] may act as a sign bit and may be used to generate twos complement output when 1 (weight is negative). According to aspects, the binary weight multiplier illustrated in FIG. 6 may be used to decode weights to generate the power-gating signals for logic associated with unused bits, as described above.

Figure 7:
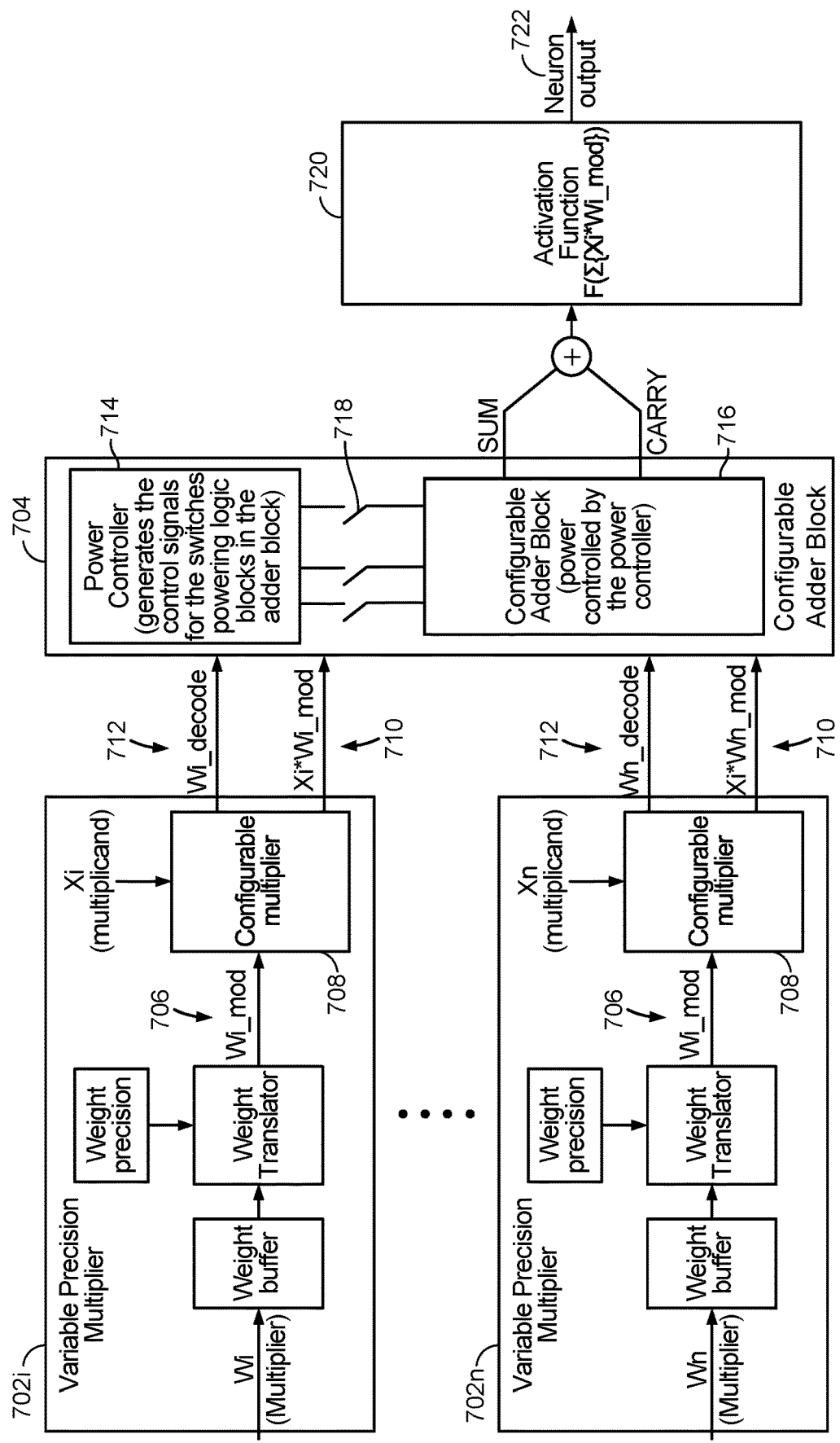
FIG. 7 illustrates an exemplary MAC block of a neural processing unit, according to certain aspects presented herein.

FIG. 7 illustrates an exemplary MAC block 700 of a neural processing unit, according to certain aspects presented herein. As illustrated, the MAC block 700 includes a plurality of variable precision multipliers 702$i$-702$n$ and a configurable adder block 704. According to aspects the variable precision multipliers 702$i$-702$n$ may comprise the variable precision multiplier 400 illustrated in FIG. 4.

According to aspects, as noted above, each variable precision multiplier 702$i$-702$n$ can be enabled/disabled at a multiplier-level of a neuron for logic configurability and power optimization. For example, as described above, the modified set of weights 706 may be decoded and used to selectively turn off one or more of the configurable multipliers 708 in the variable precision multipliers 702$i$-700$n$. In some cases, the configurable multipliers 708 may comprise the binary weight multiplier 600 illustrated in FIG. 6, for example, when implemented for 1 bit unsigned or 2 bits signed multiplication.

According to aspects, when enabled, the configurable multipliers 708 may each function to multiply at least one input (e.g., Xi-Xn) with a corresponding weight of the modified set of weights 706, resulting in a weighted input 710. The weighted input 710, along with a weight decode signal 712, may be output by the configurable multipliers 708 and passed to the adder module 704. According to aspects, the weight decode signal 712 may include information indicating the set of weights 706 in a form useable or understandable by adder module 704.

According to aspects, the adder module 1004 may include a power controller 714 that generates control signals, based on the weight decode signal 712, for enabling or disabling one or more logic elements (e.g., adders) in an adder block 716 of the adder module 704. For example, the power controller 714 may identify a set of adders in the adder block 716 to selectively turn off based on the weight decode signal 712. The power controller may then operate one or more switches 718 to selectively turn off (e.g., power collapse) the identified set of adders in the adder block 716, saving power in the adder module 704. According to aspects, a remaining set of enabled adders may function to sum the weighted inputs 710 generated by the configurable multipliers 708 of the variable precision multipliers 702$i$-702$n$. An activation function 720 may then be applied to the weighted sum of the weighted inputs 710 to generate an output 722 of the neural processing unit.

According to aspects, in some cases, the modified set of weights 706 in the variable precision multipliers 702$i$-702$n$ may be stored using one or more retention flops that include an always-on (AON) output driver. The AON output driver may allow the one or more retention flops to retain the stored set of modified weights 706 when one or more of the variable precision multipliers 702$i$-702$n$ (and corresponding retention flops) are power-collapsed. Additionally, in some cases, the original set of weights (e.g., Wi-Wn) may also be stored using one or more retention flops with an AON driver. In some cases, whether the retention flops with the AON output driver store the modified set of weights 706 or the original set of weights (Wi-Wn) may be a function of the particular use-case and a power-performance-area tradeoff.

Figure 8:
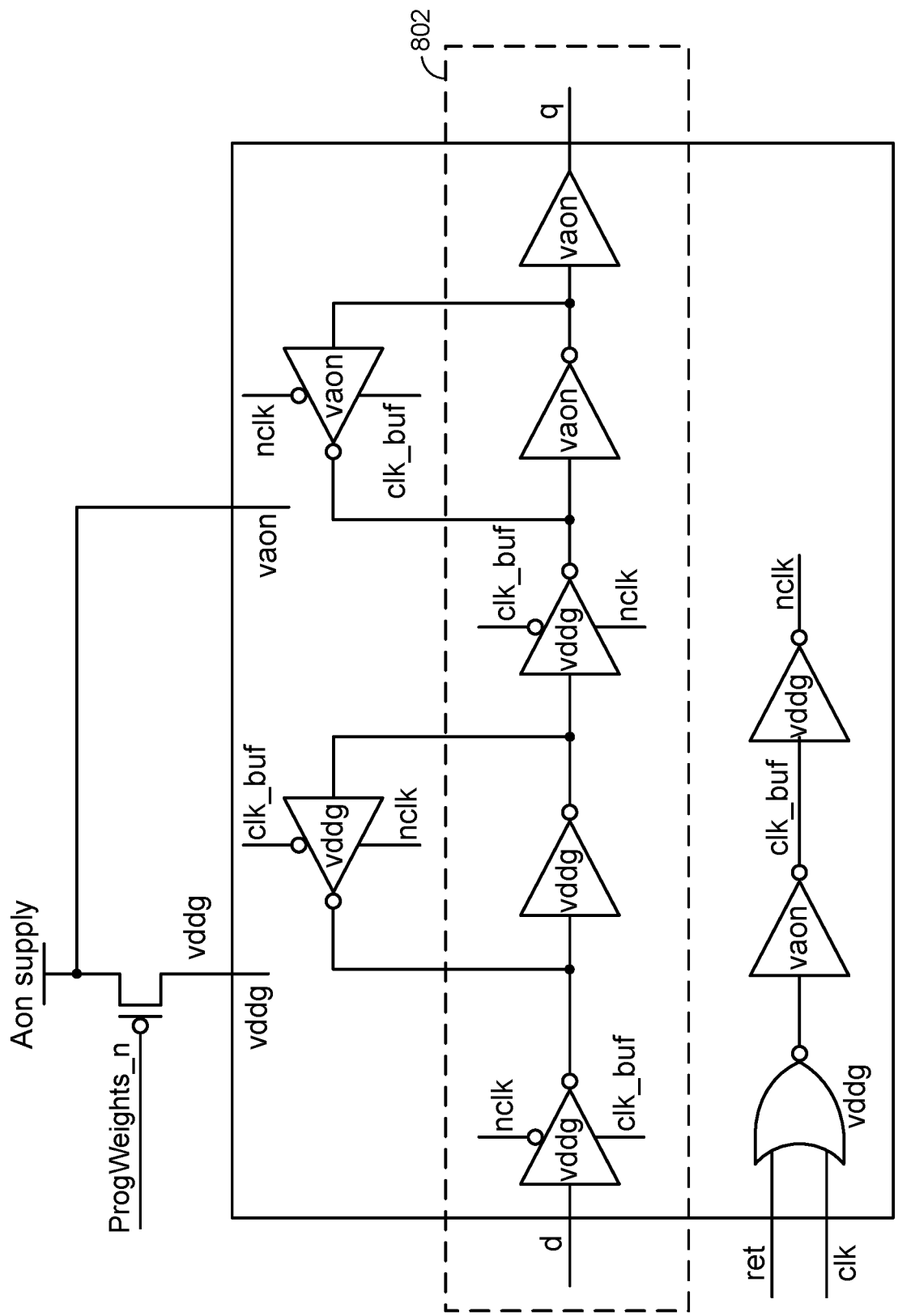
FIG. 8 illustrates a plurality of retention flops that may be used to store a modified set of weights, according to certain aspects presented herein.

For example, FIG. 8 illustrates a plurality of retention flops 802 that may be used to store the modified set of weights 706 in the variable precision multipliers 702$i$-702$n$, according to certain aspects presented herein. An AON output driver may allow for power-collapsing the retention flops 802 after programming the modified set of weight 706. Further the AON output driver at the output of the retention flops 802 may ensures that the weight value is available for computation even after a master latch is power collapsed. Additionally, as illustrated, the retention flops 802 may be hooked up in a chain (e.g., similar to a scan chain) and serially programmed with corresponding weight values from the set of modified weights 706. Additionally, as illustrated, the ProgWeights_n signal may turns-ON the PMOS switch during weight programming and may serves as a state retention signal after programming is completed.

Figure 9:
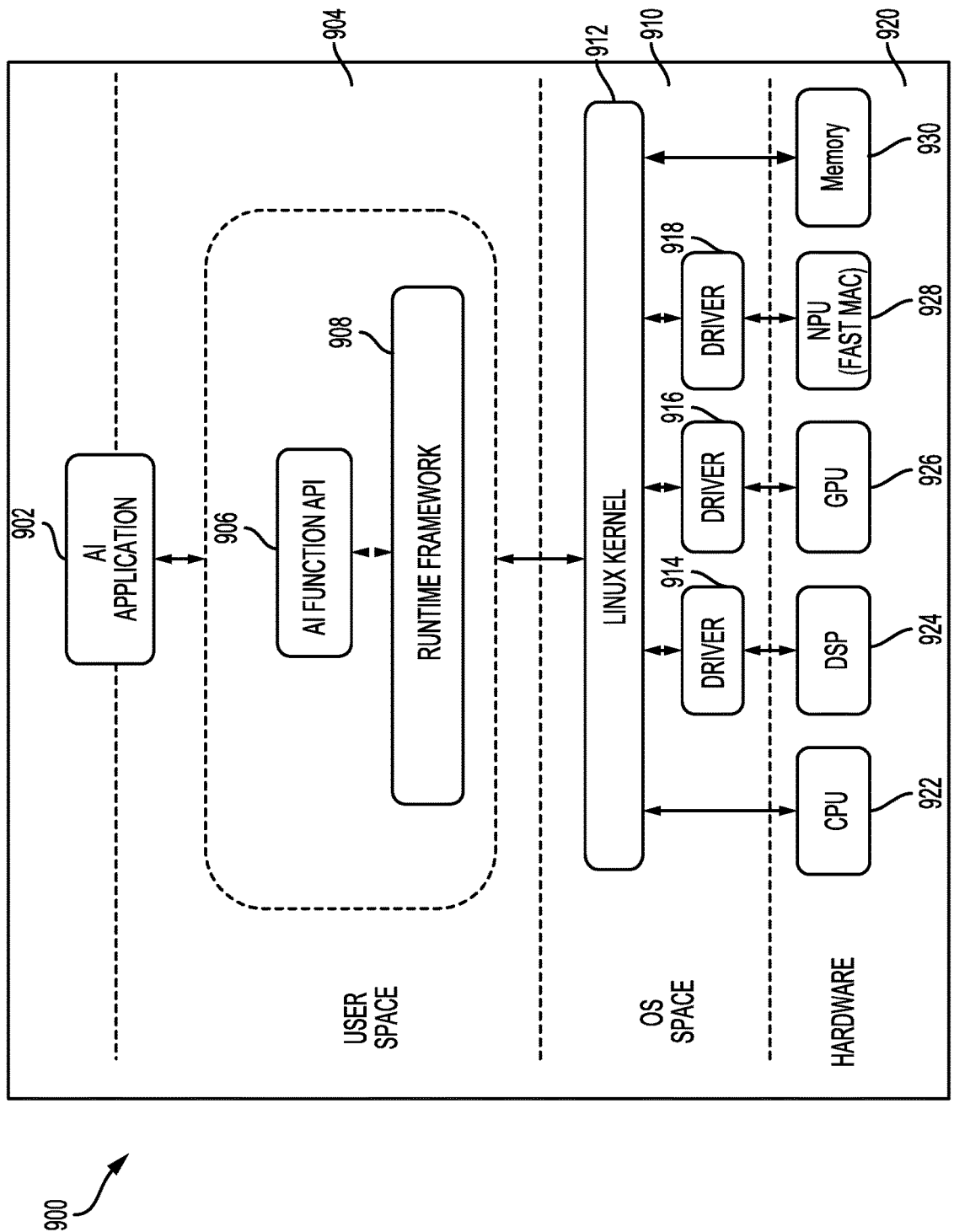
FIG. 9 is a block diagram illustrating an exemplary software architecture for modularizing artificial intelligence (AI) functions, according to certain aspects presented herein.

FIG. 9 is a block diagram illustrating an exemplary architecture 900 that may modularize artificial intelligence (AI) functions. Using the architecture, applications may be designed that may cause various processing blocks of an SOC 920 (for example a CPU 922, a DSP 924, a GPU 926, and/or an NPU 928) to precision-wise multiply-accumulate (MAC) block configuration for run-time operation of an AI application 902, according to aspects of the present disclosure. In some cases, the NPU 928 may include one or more logic elements (e.g., circuitry) configured to implement all necessary control and arithmetic logic necessary to execute machine learning algorithms, such as the algorithms described above for precision-wise multiply-accumulate (MAC) block configuration.

The AI application 902 may be configured to call functions defined in a user space 904 that may, for example, provide for the detection and recognition of a scene indicative of the location in which the device currently operates.

The AI application 902 may, for example, configure a microphone and a camera differently depending on whether the recognized scene is an office, a lecture hall, a restaurant, or an outdoor setting such as a lake. The AI application 902 may make a request to compiled program code associated with a library defined in an AI function application programming interface (API) 906. This request may ultimately rely on the output of a deep neural network configured to provide an inference response based on video and positioning data, for example.

A run-time engine 908, which may be compiled code of a runtime framework, may be further accessible to the AI application 902. The AI application 902 may cause the run-time engine, for example, to request an inference at a particular time interval or triggered by an event detected by the user interface of the application. When caused to provide an inference response, the run-time engine may in turn send a signal to an operating system in an operating system (OS) space 910, such as a Linux Kernel 912, running on the SOC 920. The operating system, in turn, may cause a precision-wise MAC block configuration function to be performed on the CPU 922, the DSP 924, the GPU 926, the NPU 928, or some combination thereof. For example, in some cases, CPU 922, the DSP 924, the GPU 926, the NPU 928 or some combination thereof may be configured to perform operations for precision-wise MAC block configuration such as receiving, at a neural processing unit comprising one or more logic elements, at least one input associated with a use-case of the neural processing unit; obtaining a set of weights associated with the at least one input; selecting a precision for the set of weights; modifying the set of weights based on the selected precision; and generating an output based, at least in part, on the at least one input, the modified set of weights, and an activation function. Additionally, in some cases, code for performing the precision-wise MAC block configuration function may be stored in a non-transitory computer-readable medium, such as, memory 930 and accessible by the CPU 922, the DSP 924, the GPU 926, and the NPU 928 via Linux Kernel 912.

In some cases, the CPU 922 may be accessed directly by the operating system, and other processing blocks may be accessed through a driver, such as a driver 914, 916, or 918 for, respectively, the DSP 924, the GPU 926, or the NPU 928. In the exemplary example, the deep neural network may be configured to run on a combination of processing blocks, such as the CPU 922, the DSP 924, and the GPU 926, or may be run on the NPU 928.

Figure 10:
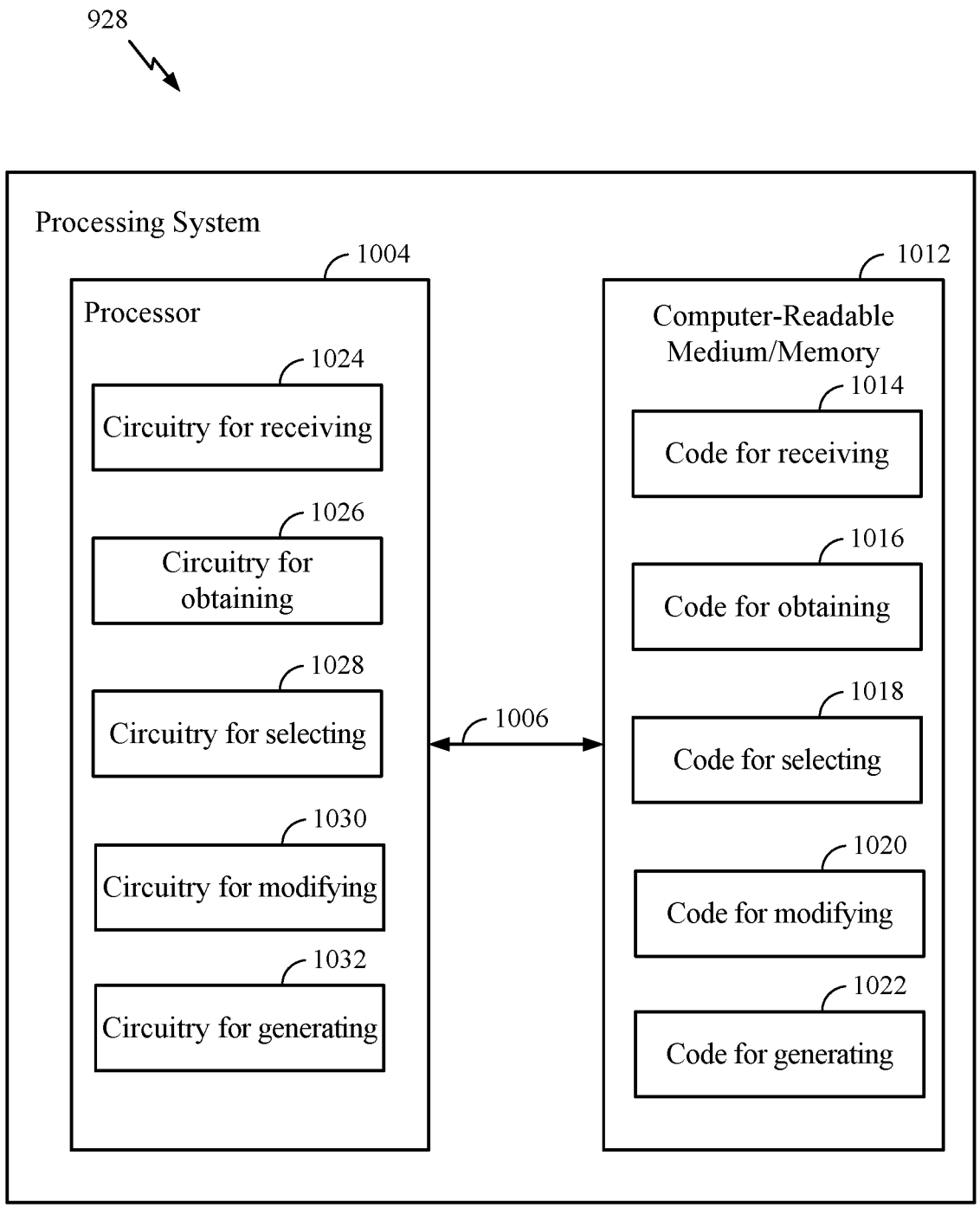
FIG. 10 illustrates a neural processing unit that may include various components configured to perform operations for the techniques disclosed herein in accordance with aspects of the present disclosure.

FIG. 10 illustrates NPU 1000 that may include various components (e.g., corresponding to means-plus-function components) configured to perform operations for the techniques disclosed herein, such as the operations illustrated in FIG. 3. In some cases, the NPU 1000 may comprise the NPU 928 illustrated in FIG. 9. In some cases, NPU 1000 may be implemented in CPU 922, DSP 924, or GPU 926 illustrated in FIG. 9. The NPU 1000 includes a processing system 1002 configured to perform processing functions for the NPU 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 3, or other operations for performing the various techniques discussed herein for precision-wise MAC block configuration. In certain aspects, computer-readable medium/memory 1012 stores code 1014 for receiving, at a neural processing unit comprising one or more logic elements, at least one input associated with a use-case of the neural processing unit; code 1016 for obtaining a set of weights associated with the at least one input; code 1018 for selecting a precision for the set of weights; code 1020 for modifying the set of weights based on the selected precision; and code 1022 for generating an output based, at least in part, on the at least one input, the modified set of weights, and an activation function.

In certain aspects, the processor 1004 includes circuitry configured to implement the code stored in the computer-readable medium/memory 1012. For example, the processor 1004 includes circuitry 1024 for receiving, at a neural processing unit comprising one or more logic elements, at least one input associated with a use-case of the neural processing unit; circuitry 1026 for obtaining a set of weights associated with the at least one input; circuitry 1028 for selecting a precision for the set of weights; circuitry 1030 for modifying the set of weights based on the selected precision; and circuitry 1032 for generating an output based, at least in part, on the at least one input, the modified set of weights, and an activation function.

The various illustrative circuits described in connection with aspects described herein may be implemented in or with an integrated circuit (IC), such as a processor, a digital signal processor (DSP), an application-specific integrated circuit (ASIC), a field-programmable gate array (FPGA), or other programmable logic device. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

The invention claimed is:

1. A method for configuring a multiply-accumulate (MAC) block for an artificial neural network, comprising:
receiving, at a neural processing unit comprising one or more logic elements, at least one input associated with a use-case of the neural processing unit;
obtaining a set of weights from a weight buffer associated with the at least one input;
selecting a precision for the set of weights;
modifying the set of weights based on the selected precision;
generating an output based, at least in part, on the at least one input, the modified set of weights, and an activation function; and
storing the modified set of weights in one or more retention flops that include an always-on output driver, wherein the always-on output driver allows the one or more retention flops to retain the stored set of weights when at least one of the one or more logic elements, corresponding to the one or more retention flops, is power-collapsed.

2. The method of claim 1, wherein selecting the precision for the set of weights comprises: determining, from a total number of bits associated with the set of weights, a number of most significant bits for the set of weights, wherein the precision is represented by the number of most significant bits.

3. The method of claim 2, further comprising: selectively turning off at least one of the one or more logic elements in the neural processing unit based on the modified set of weights.

4. The method of claim 3, wherein selectively turning off the at least one of the one or more logic elements further comprises:
decoding the modified set of weights;
determining which of the one or more logic elements to turn off based on the decoded modified set of weights; and
turning off the at least one of the one or more logic elements based on the determination of which of the one or more logic elements to turn off.

5. The method of claim 4, wherein:
determining which of the one or more logic elements to turn off comprises identifying a set of logic elements that do not correspond to the determined number of most significant bits; and
turning off the at least one of the one or more logic elements based on the determination of which of the one or more logic elements to turn off comprises turning off the set of logic elements that do not correspond to the identified number of most significant bits.

6. The method of claim 4, wherein the one or more logic elements comprise at least one of:
one or more adder blocks in an adder module of the neural processing unit; or
one or more multiplier blocks in a multiplier module of the neural processing unit.

7. The method of claim 3, wherein selectively turning off the at least one of the one or more logic elements comprises at least one of:
power gating the at least one of the one or more logic elements; or
data gating the at least one of the one or more logic elements.

8. The method of claim 1, wherein modifying the set of weights based on the selected precision is performed according to a translation algorithm.

9. The method of claim 8, wherein the translation algorithm is determined based on a type of the use-case.

10. An apparatus for configuring a multiply-accumulate (MAC) block for an artificial neural network, comprising:
a neural processing unit, comprising one or more logic elements, configured to:
receive at least one input associated with a use-case of the neural processing unit;
obtain a set of weights from a weight buffer associated with the at least one input;
select a precision for the set of weights;
modify the set of weights based on the selected precision; and
generate an output based, at least in part, on the at least one input, the modified set of weights, and an activation function; and
a memory coupled with the neural processing unit, configured to
store the modified set of weights in one or more retention flops that include an always-on output driver, wherein the always-on output driver allows the one or more retention flops to retain the stored set of weights when at least one of the one or more logic elements, corresponding to the one or more retention flops, is power-collapsed.

11. The apparatus of claim 10, wherein in order to select the precision for the set of weights comprises the neural processing unit is further configured to determine, from a total number of bits associated with the set of weights, a number of most significant bits for the set of weights, wherein the precision is represented by the number of most significant bits.

12. The apparatus of claim 11, wherein the neural processing unit is further configured to selectively turn off at least one of the one or more logic elements in the neural processing unit based on the modified set of weights.

13. The apparatus of claim 12, wherein in order to selectively turn off the at least one of the one or more logic elements the neural processing unit is further configured to:
decode the modified set of weights;
determine which of the one or more logic elements to turn off based on the decoded modified set of weights; and
turn off the at least one of the one or more logic elements based on the determination of which of the one or more logic elements to turn off.

14. The apparatus of claim 13, wherein:
in order to determine which of the one or more logic elements to turn off the neural processing unit is further configured to identify a set of logic elements that do not correspond to the determined number of most significant bits; and
in order to turn off the at least one of the one or more logic elements based on the determination of which of the one or more logic elements to turn off the neural processing unit is further configured to turn off the set of logic elements that do not correspond to the identified number of most significant bits.

15. The apparatus of claim 13, wherein the one or more logic elements comprise at least one of:
one or more adder blocks in an adder module of the neural processing unit; or one or more multiplier blocks in a multiplier module of the neural processing unit.

16. The apparatus of claim 12, wherein in order to selectively turn off the at least one of the one or more logic elements the neural processing unit is further configured to:
power gate the at least one of the one or more logic elements; or
data gate the at least one of the one or more logic elements.

17. The apparatus of claim 10, wherein the neural processing unit is further configured to modify the set of weights based on the selected precision according to a translation algorithm, wherein the translation algorithm is determined based on a type of the use-case.

18. An apparatus for configuring a multiply-accumulate (MAC) block in an artificial neural network, comprising:
means for receiving at least one input associated with a use-case of a neural processing unit;
means for obtaining a set of weights from a weight buffer associated with the at least one input;
means for selecting a precision for the set of weights;
means for modifying the set of weights based on the selected precision;
means for generating an output based, at least in part, on the at least one input, the modified set of weights, and an activation function; and
means for storing the modified set of weights in one or more retention flops that include an always-on output driver, wherein the always-on output driver allows the one or more retention flops to retain the stored set of weights when at least one of the one or more logic elements, corresponding to the one or more retention flops, is power-collapsed.

* * * * *